United States Patent [19]

Suginaka

[11] 4,290,761
[45] Sep. 22, 1981

[54] LAGGING BODY FOR BELT CONVEYOR PULLEY

[75] Inventor: Mutsuo Suginaka, Toyonaka, Japan

[73] Assignee: Nippon Tsusho Company Limited, Hiroshima, Japan

[21] Appl. No.: 48,567

[22] Filed: Jun. 14, 1979

[30] Foreign Application Priority Data

Dec. 26, 1978 [JP] Japan .......................... 53/176675[U]
Jan. 8, 1979 [JP] Japan ...................................... 54/222
Apr. 11, 1979 [JP] Japan ................................. 54/43839

[51] Int. Cl.$^3$ ....................... F16H 55/48; B65G 23/12
[52] U.S. Cl. ................................. 474/190; 29/121.1; 198/835
[58] Field of Search .................... 74/229, 230.5, 230.7, 74/214, 215; 198/842, 843, 835; 29/120, 121.1, 121.2–121.5; 474/189, 190, 191; 152/210, 211; 188/251 R, 251 A; 174/184, 185, 186, 187

[56] References Cited

U.S. PATENT DOCUMENTS

| | | | |
|---|---|---|---|
| 1,330,988 | 2/1920 | Sayre | 74/230.7 |
| 2,162,279 | 6/1939 | Herchenrider | 29/121.2 X |
| 2,707,403 | 5/1955 | Thomson et al. | 474/191 |
| 3,010,332 | 11/1961 | Skates | 74/230.7 |
| 3,042,989 | 7/1962 | Foley | 29/121.2 X |
| 3,064,769 | 11/1962 | Billmeyer | 188/251 R X |
| 3,354,735 | 11/1967 | Holz | 74/215 |

*Primary Examiner*—C. J. Husar
*Assistant Examiner*—Conrad Berman
*Attorney, Agent, or Firm*—Ladas & Parry

[57] ABSTRACT

A lagging body for a belt conveyor pulley comprises a wide and long rubber substrate and a number of rectangular or square small plate-like ceramic lagging elements aligned in the lateral and longitudinal directions and secured on the surface of said wide and long rubber substrate having a given thickness, wherein a lagging element is produced by adding an inorganic bonding agent essentially consisting of glassy material to ceramic particles, molding the resultant particles into a rectangular or square small plate-like article and firing or sintering the small plate-like article, and a number of the lagging elements are aligned on the surface of a wide and long length rubber substrate in the longitudinal and lateral directions and secured thereon.

A free size lagging body is available to secure onto the outer periphery of a pulley drum by free size for repairing the pulley drum so as to eliminate inconvenience caused by the exchange of damaged pulley and wastefulness of time for waiting for the supply of new pulley.

33 Claims, 25 Drawing Figures

FIG_1A
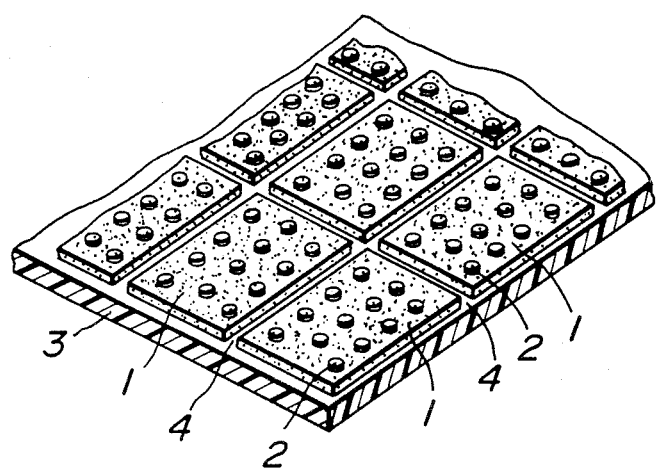
FIG_1B
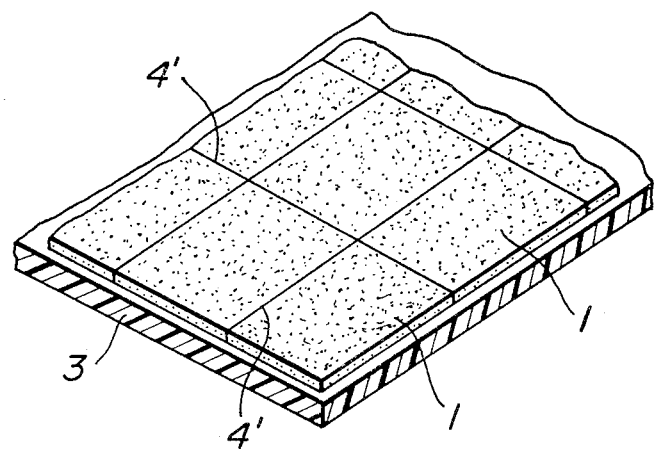

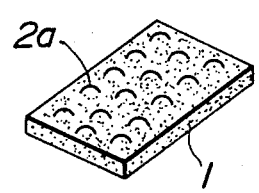
*FIG.2A*
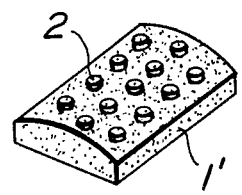
*FIG.2B*
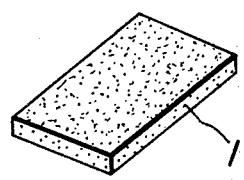
*FIG.2C*
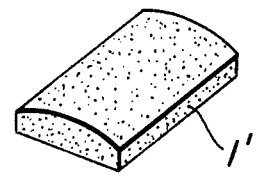
*FIG.2D*
*FIG.3*
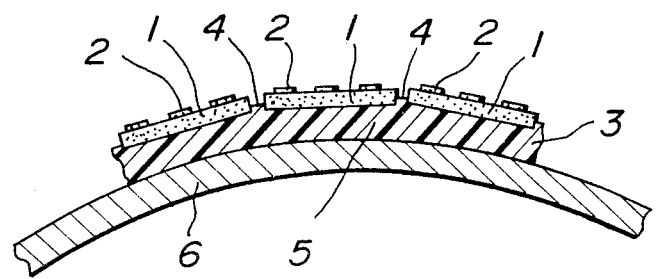

FIG_9
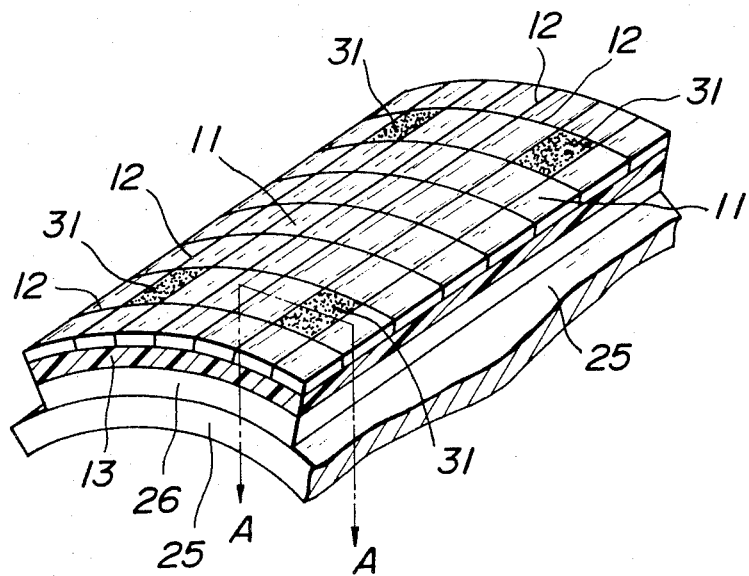
FIG_10A   FIG_10B   FIG_10C
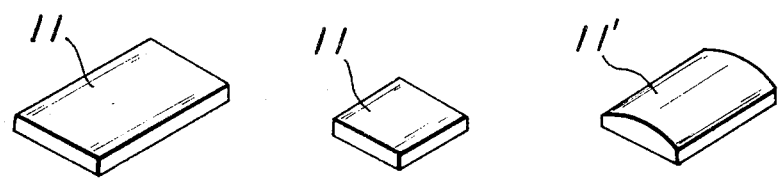

LAGGING BODY FOR BELT CONVEYOR PULLEY

BACKGROUND OF THE INVENTION

The present invention relates to a lagging body for a belt conveyor pulley.

In a conventional belt conveyor device, a rubber lining has been widely used on the outer periphery of the belt contacting surface of the drive pulley. However, such a pulley is quickly worn out. Further, as a snap pulley or the like, a metal drum having no lining is often used, but such a metal drum is easily worn out and is also swollen when the conveyed material becomes adhered to its outer periphery. As a result, the belt is disturbed from its normal driving and meanders like a snake and has to be stopped occasionally. Some snap pulleys are lined with rubber plates, but such pulleys are severely worn out and have to be exchanged every 2-3 months.

It has been known to secure ceramic lagging elements on the outer surface of metallic pulley for a belt conveyor in order to increase the friction coefficient. However, the pulley having ceramic lagging elements adhered on the surface is generally completed as a final product in a factory and transported to the place where the pulley is required. Therefore, if an old type pulley only lined with rubber plate has to be exchanged for a new type pulley which has ceramic lagging elements on the surface thereof, it takes a long time to wait for the arrival of a new type pulley and it requires a lot of expenses.

Recently, there has been proposed a pulley in which the cylindrical periphery of the pulley drum is adhered with a lagging element comprising of wear-resistant ceramics. Such lagging element is used for drive pulley and produced by adding a proper amount of synthetic resin bonding agent to a desired amount of ceramic particles such as alumina having a comparatively large grain size, and molding and sintering so as to have a coarse surface. These heretofore proposed lagging elements are produced by mixing phenol resin or polyurethane as a bonding agent into ceramic particles and molding and heating at low temperature. However, because the bonding agent is easily aged or deteriorated, such lagging element has drawbacks that its weather resistant and water resisting properties are poor and the ceramic particles are liable to be removed, and its durability is unreliable.

SUMMARY OF THE INVENTION

The present invention has been invented for the purpose of removing the above disadvantage such as poor weather resistance and water resisting properties inherent to said conventional lagging elements.

An object of the present invention is to provide a lagging body for a belt conveyor pulley having excellent weather resistant and water resistant properties, by using an inorganic bonding agent mainly consisting of glassy material selected from silicon dioxide, sodium silicate and glaze in accordance with a size of ceramic particle, a property of available lagging element or the like, as a bonding agent to be added in case of firing or sintering ceramic particles, thereby a desired lagging element having excellent durability is obtained by firing or sintering, and to provide a ceramic lagging body aligned and secured a number of these lagging elements in longitudinal and lateral directions on the surface of a rubber substrate by means of heat bonding or adhesive bonding.

The present invention is to provide a free size lagging body which comprises a wide and long rubber substrate and a ceramic lagging element secured on the surface of said rubber substrate in the lateral and longitudinal directions with or without groove between adjacent lagging elements, thereby said ceramic lagging body can be secured onto the outer periphery of a pulley drum or any size for repairing the pulley drum so as to eliminate inconvenience caused by the exchange of damaged pulley and wastefulness of time for waiting for the supply of new pulley. According to the present invention, the supply of free size lagging body supported by wide and long rubber substrate can be attained for repairing of the pulley at the place where a belt conveyor is used, and the ceramic lagging element having a sufficient water-resistant property and durability by firing or sintering of ceramic lagging material mixed with inorganic bonding material can easily be provided for said lagging body.

An object of the present invention is to provide a free size lagging body available for a pulley which comprises a rubber substrate, a rectangular or square small plate-like lagging element having a number of small projections on the smooth and compact surface of the elements or a coarse surface as a whole aligned with or without spacing grooves in the lateral and longitudinal directions and secured on the surface of said rubber substrate, thereby the rubber substrate secured the lagging elements thereon is cut-off into a desired size along the boundary of lagging element so as to adhere the thus cut-off substrate to the outer periphery of the pulley which need lagging body for the purpose of repairing or reconstruction at the place where a belt conveyor is located.

According to the present invention, a desired pulley can easily be repaired by adhering said free size ceramic lagging body cut-off into desired size on the outer periphery of a pulley drum through the rubber substrate by a simple operation at the site and these free size lagging body having a coarse surface as a whole or a smooth and compact surface with a number of small projections scatteredly formed on the surface of the lagging element can be used for repairing the driving pulley.

Another object of the present invention is to provide a free-size type ceramic lagging body with a rubber substrate, wherein a number of smooth and compact, flat, rectangular or square small plate-like water-resistant lining lagging elements consisting of ceramics are closely arranged side by side on the wide and long rubber substrate having a predetermined thickness in the lateral and longitudinal direction so that this lagging body can be cut into a desired size along the boundary of the lagging element and adhered around the outer periphery of the pulley by an adhesive agent. Since the ceramic lagging body according to the present invention can be adhered to a pulley by a simple operation at the side where is the belt conveyor pulley for repairing, it can be used as entirely new snap pulley, bend pulley or tension pulley having excellent wear resistance, durability, water resistance.

A further object of the present invention is to provide a lagging body available for a pulley which comprises a partition type metal substrate having a trough-like cross section and divided into several so as to detachably secure around the outer periphery of a metal pulley drum, a rubber substrate secured on said metal substrate, a number of ceramic lagging elements closely aligned side by side with or without spacing grooves have a desired width in the lateral and longitudinal directions and secured on the outer surface of said rubber substrate.

The reason why said free-size type lagging body with a rubber substrate or a partition-type lagging body with rubber and metal substrate according to the present invention is provided is to make repairing and reconstruction of a metal pulley drum easy at the site of belt conveyor operation. The time and expenses required for delivering a pulley completed at a special factory to the site are remarkably alleviated, any damage caused by stopping the delivery operation for a long time in order to exchange pulleys can be suppressed to the least, and repairing and reconstruction are safely and efficiently carried out without facing any difficulty and danger occurred by dismantling or detaching a large and heavy metal pulley at the site.

A still further object of the present invention is to provide lagging elements and lagging bodies for roughening the surface of a pulley and improving wear resistance in accordance with functions of a drive pulley. That is, since it is necessary to maintain large frictional force between a conveyor belt and a lagging element, the surface of a lagging element for a drive pulley is roughened, or if the lagging element has a compact and smooth surface, the surface is provided with a number of small projections so as to make it uneven, or the surface is roughened with a number of small projections on the surface of lagging elements.

Another object of the present invention is to eliminate disadvantages of conventional lagging elements for snap pulley, bend pulley and tension pulley, by making the surface of lagging elements compact and smooth, closely aligning a number of lagging elements on a rubber substrate without providing any spacing groove between adjacent lagging elements, thereby preventing a conveying article remained on a conveyor belt from clogging in the spacing groove, further preventing the whole periphery of the pulley from swelling caused by clogged article, and preventing the conveyor belt from meandering, or avoiding operation of the belt conveyor from stopping as the case may be, and still further object of the present invention is to provide lagging elements and lagging bodies for improving wear resistance and for long durability in accordance with functions of these pulleys.

Another object of the present invention is to provide each kind of pulleys for belt conveyors by mounting the above lagging body in which lagging element a rubber substrate secured on a metal pulley so as to completely perform every function.

As a ceramic particle used in case of manufacturing a lagging element according to the present invention, the particle preferably consists of at least one element selected from the group consisting of forsterite ($2MgO.SiO_2$), steatite ($MgO.SiO_2$), mullite ($3Al_2O_3.2SiO_2$), cordierite ($2MgO.2Al_2O_3.5SiO_2$), titania ($TiO_2$), silicon carbide (SiC) and silicon nitride ($Si_3N_4$).

As an inorganic bonding agent used in case of manufacturing a lagging element according to the present invention, it is preferable to use an inorganic bonding agent essentially consisting of glassy material selected from silicon dioxide ($SiO_2$), sodium silicate and glaze, 20-10% by weight of which is added to the ceramic particle and fired at high temperature. If more than 20% by weight of the inorganic bonding agent is added to ceramic particles, the hardness of fired lagging element is lowered and vitrified and a ratio of bonding ability is also lowered. On the other hand, if the addition amount of inorganic bonding agent is less than 10% by weight, the bonding ability becomes insufficient and as a result, the wear resistance of the lagging element is deteriorated, so that an addition amount of the inorganic bonding agent is preferably 20-10% by weight to the ceramic particles.

In order to increase hardness of the lagging element and to improve wear resistance, it is preferable to press-mold and make firing the ceramic particles at a high temperature. With such treatment, it becomes possible to obtain a ceramic water-resistant small plate-like ceramic element having a smooth and compact surface, so that, a conveyed article remained and adhered to conveyor belt does not freely adhere so as to wear the snap pulley, bend pulley and tension pulley by such residual adhered articles.

In case of press-molding the ceramic particle, a rectangular or square small plate-like element is formed by projecting a number of small projections on the surface of said element and fired at a high temperature. As a result, a compact ceramic lagging element having a smooth surface provided with a number of small projections can be obtained, thus the element has a large frictional force for the use of drive pulley.

A high sintering temperature of the ceramic particle in this case is preferably more than 1,600° C. In addition, the above press-molding is preferably carried out by applying a pressure of at least more than 0.5 ton/cm². The ceramic particle in this case is preferably 5–30µ.

When the lagging element for a drive pulley is required economically, the above press-molding may be omitted, 20-10% by weight of an inorganic bonding agent is added to coarse ceramic particles of 10-54 meshes, kneaded together by mixing with a sufficient volume of water, molded into a rectangular or square small plate-like body without applying any pressure, and sintered at a low temperature such as 800°-1,000° C. As a result, a lagging element having a uniformly roughened surface can be obtained. The molding in this case is preferably carried out at less than 0.5 ton/cm².

The reason why coarse ceramic particle of 10-54 meshes is used in order to obtain a lagging element having a roughened surface is that the particle of less than 54 meshes is too fine to roughen the surface, while the particle of more than 10 meshes lowers bonding strength. Therefore, if the coarse surface is desired, it is preferable to use the coarse ceramic particle of 10-54 meshes.

BRIEF DESCRIPTION OF THE DRAWINGS

The present invention will be explained in more detail referring to the accompanying drawings, in which:

FIGS. 1(A) and (B) are perspective views showing a part of a lagging body with and without spacing groove between adjacent lagging elements according to the present invention;

FIGS. 2(A), (B), (C) and (D) are perspective views of a small plate-like lagging elements, respectively, in which FIG. 2(A) shows a flat and coarse upper surface provided with small projections. FIG. 2(B) shows a slightly arcuate upper surface thereof, FIG. 2(C) shows a coarse surface without small projections and FIG. 2(D) shows a slightly arcuate surface thereof;

FIG. 3 is a cross-sectional view showing a lagging body according to the present invention under the state of being adhered to the outer peripheral surface of the pulley by cutting at right angle to the axial line of the pulley;

FIGS. 4 to 6D show other embodiments of the present invention; in which FIG. 4 is a schematic side view of an example of a belt conveyor showing relation between pulleys, FIGS. 5(A), (B) and (C) are perspective views of a part of a lagging body according to the present invention showing other embodiments, and FIGS. 6(A), (B), (C) and (D) are perspective views of a small plate-like lagging elements, FIG. 6(C) shows a flat and smooth surface with small projections and FIG. 6(D) shows an arcuate smooth surface with small projections thereof.

FIGS. 8 to 12 show further embodiments of the present invention. FIG. 8 is a partial perspective view of the first embodiment. FIG. 9 is a partial perspective view of the second embodiment, respectively. FIGS. 8 and 9 show states of successively superposing a trough-like metal substate, a rubber substrate and a lagging element on the peripheral surface of a metal pulley. FIGS. 10(A), (B) and (C) are perspective views illustrating shapes of a lagging element. FIG. 10(A) shows a smooth and compact rectangular lagging element without small projections, and FIG. 10(B) shows a square lagging element thereof and FIG. 10(C) shows an arcuate lagging element thereof, respectively. FIGS. 11 and 12 are explanatory diagrams of the second embodiment shown in FIG. 9, in which FIG. 11 is a cross section along the line A—A of FIG. 9, and FIG. 12 is a perspective view of a bolt with a hexagonal hole;

FIGS. 13 and 14 show still further embodiments of the present invention, in which FIG. 13 is a partial perspective view showing an enlarged part of a drive pulley, and FIG. 14 is a cross section along the line A—A of FIG. 13.

In FIGS. 1-3, 1, 1' are lagging elements, 2 small projections, 3 a rubber substrate, 4 grooves, 4' fine boundary lines between adjacent lagging elements aligned in lateral and longitudinal directions, 5 an adhesive layer, and 6 a pulley.

In FIGS. 4-7, 11, 11' are lagging elements, 12 fine boundary lines, 13 a rubber substrate, 14 an adhesive layer, 15 a conveyor belt, 16 a drive pulley, 17 a following pulley, 18 a snap pulley, 19 a hopper, 20 an article to be conveyed, 21 a bent pulley, 22 a tension pulley, 23 a remained article on the conveyor and 24 a chute.

In FIGS. 8-12, 11 is a lagging element, 12 fine boundary lines between adjacent lagging elements aligned in the lateral and longitudinal directions, 13 a rubber substrate, 25 metal pulley drum, 26 a metal substrate having a trough-like cross section, 27 a bolt hole, 28 a bolt with a hexagonal hole, 29 a bolt hole, 30 a screw hole, and 31 a filler.

In FIGS. 13 and 14, 25 is a metal pulley drum, 26 a metal substrate, 33, 33' bolt and nuts, 34 wear-resistant lagging elements, 35 a rubber adhesive layer, 36, 37 grooves, and 38 a small projection.

DESCRIPTION OF THE PREFERRED EMBODIMENTS

Figure 4:
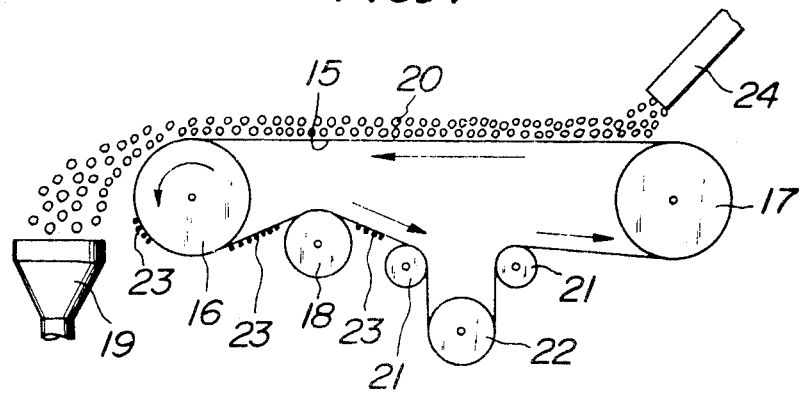

The present invention will be explained in more detail with reference to the accompanying drawings.

In FIG. 1, 1 is a rectangular small plate-like ceramic lagging element with grooves 4 of a desired width between adjacent lagging elements, and a number of the lagging elements are arranged in the longitudinal and lateral directions on the surface of a wide and long rubber substrate 3 having a desired thickness, and secured thereto by heat bonding or an adhesive agent. 2 is a small low projection having a circular cross section, a number of which are scatteringly formed on the top surface of the lagging element 1. Such arrangement of the small projections 2 makes the surface of the lagging element 1 uneven. In order to bond the lagging elements 1 on the surface of the ruber substrate 3, a number of lagging elements 1 having a desired adhesive agent applied to the rear surface are closely aligned side by side (FIG. 1B) or with spacing grooves 4 between adjacent elements in the lateral and longitudinal directions (FIG. 1A) and heated with a pressure in a mold. As shown in FIG. 3, the bottom surface of the lagging element is heat-bonded and secured to said rubber substrate 3 with a slight depression being formed in the surface of said rubber substrate 3.

Further, the above-mentioned lagging element 1 is flat on both side surfaces with small projections on upper surface as shown in FIG. 2(A), but the top surface is sometimes slightly arcuate as shown in FIG. 2(B), while the rear surface is remained flat. In this case, if the lagging element 1' is rectangular, the top surface in cross section parallel to the short side becomes arcuate. If the lagging elements have an arcuate surface in one side, it becomes possible to make the surface of the lagging element 1' cylindrical, when the lagging elements are adhered to the surface of a pulley. Further, the small projections formed on the surface of the lagging element may be cup-like as shown in FIG. 2(A) or lozenge-shaped (not shown).

A preferable result may be obtained if the ceramic lagging element 1 or 1' according to the present invention is prepared as follows.

(1) To about 80–90% by weight of fine powder of about 5–30 $\mu$ of one or more ceramics selected from alumina, zircon, silicon carbide, silicon nitride, zirconia, titania, mullite and cordierite is added about 20–10% by weight of a bonding agent essentially consisting of silicon dioxide, and the resulting composition is press-molded with a pressure of at least 0.5 ton/cm$^2$ thereto into a rectangular or square small plate-like body and fired at a temperature of more than 1,600° C.

(2) To about 80–90% by weight of particle of about 10–45 meshes of one or more ceramics selected from alumina, zircon, silicon carbide, silicon nitride, zirconia, titania, mullite and cordierite is added about 20–10% by weight of an inorganic bonding agent essentially consisting of silicon dioxide, sodium silicate and glaze, and the resulting composition is molded into a rectangular or square small plate-like body with a pressure of less than 0.5 ton/cm$^2$ and sintered at a temperature of 800°–1,000° C.

In both above cases (1) and (2), use is made of an inorganic bonding agent essentially consisting of glassy material, and it has been confirmed that the product has a water resisting property, ceramic particles are hardly removed because of ageing or the like, and a long use can be expected.

Further, the lagging element according to the above case (1) is press-molded and fired at a high temperature, so that its surface is comparatively compact and smooth, and it may be used upon snap pulley, bend pulley or tension pulley and upon a driving pulley if small projections are formed scatteringly on the upper surface in order to provide a large friction coefficient. The lagging element according to the above case (2) has a coarse surface, any may be used upon a driving pulley without need for formation of small projections. However, small projections may be formed on the coarse surface in order to provide a still large friction coefficient.

As an example of the actual dimensions in the present invention, a rubber substrate is about 2 m × 2 m at maximum and its thickness is about 5–10 mm.

The lagging element 1, in case of the rectangular shape, is about 30 mm long × about 45 mm wide and about 6 mm in thickness. In addition, in case of adhering to a pulley, as described above, the side of 45 mm is placed in parallel to the axial direction (widthwise direction) of the pulley and the width and depth of the spacing groove 4 are each about 5 mm.

In addition, the small projection scatteringly formed on the surface of the lagging element are about 1 mm in height. The diameter of a cylindrical shape projection, the maximum diameter of a cup shape projection and one side length of a lozenge shape projection are each about 5 mm each. In this connection, the friction coefficient in case of unevenly forming the small projections on the surface of the lagging element as described above is compared with the conventional ceramic lagging element not having a small projection surface and the result is illustrated in the following table.

| Conveying surface | Surface condition | | |
|---|---|---|---|
| | No small projection | Having small projection | |
| | | Example 1 | Example 2 |
| Dry state | 0.65–0.75 | 0.82–0.91 | 0.83–0.90 |
| Wet state | 0.35–0.47 | 0.48–0.52 | 0.49–0.53 |

As an adhesive for adhering the lagging body according to the invention to the surface of a pulley, use may be made of a rubber bonding agent or a bonding agent of epoxy resin in double fluid state.

According to the present invention as described above, a rubber substrate having lagging elements secured thereto is cut along a spacing groove 4, selected by matching it with the length of the outer periphery and the width of a pulley to be lined, the thus cut lagging body is adhered to the outer periphery of the pulley by a simple operation, so that it is easy to manufacture a pulley lined with a ceramic lagging element at the place where a belt conveyor is used, which is very efficient and economical. After adhering the lagging body according to the present invention to the surface of the pulley, it can strongly be secured to the thick rubber substrate by heat bonding or an adhesive, so that even if a shock is applied to the ceramic lagging element from the outside, the rubber substrate acts as a buffer and the ceramic lagging body is not cracked and particles are not removed.

As to transport, storage or the like, the thick rubber substrate protects the lagging element and damage, breakage, particle removal or the like do not occur.

When the lagging element is formed with an uneven top surface, the lagging body as a large friction coefficient. Further, when the quality of the bonding agent used for firing or sintering is properly selected, remarkable effects such as strong water resisting property, durability can be obtained.

Figure 6A:
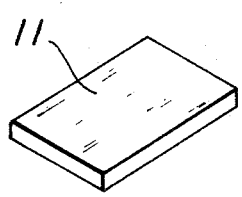
FIG. 6(A) shows a flat and smooth upper surface of said element.
Figure 6B:
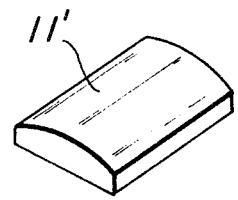
FIG. 6(B) shows an arcuate and smooth upper surface thereof.
Figure 6C:
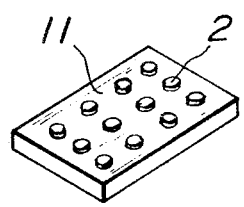
Figure 6D:
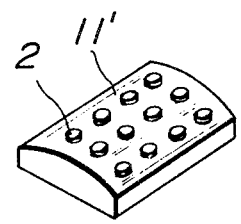
Figure 7:
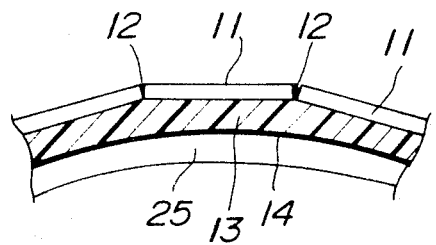
FIG. 7 is a partial cross-sectional view showing an end portion of lagging body according to the present invention shown in FIG. 5 under the state of being adhered to the outer peripheral surface of a pulley drum such as a snap pulley, viewed from an axial direction of the pulley.

FIGS. 5 to 7 show another embodiments of the present invention available to the lagging body for use for snap pulley, bend pulley and tension pulley.

As illustrated in FIG. 4, in a conventional belt conveyor apparatus or the like, a snap pulley 18 for providing a large contact angle between the conveyor belt 15 and the drive pulley 16 contacts the conveyor belt 15 on the returning run of the conveyor belt 15, so that the snap pulley 18 is strongly worn by material 23 which remain from the material 20 conveyed on the conveyor belt 15 to be dropped into a hopper 19. The snap pulley 18 is sometimes made simple as a metal drum having no lining, but such pulley is quickly worn out and also swollen by adhering the residual material conveyed on the surface of the belt conveyor and the belt conveyor has to be stopped occasionally as described before. All the other snap pulleys are of a metal drum type lined with rubber material, but such pulleys have low wear resistance and the surface-lining rubber material must be exchanged every 2–3 months. The belt conveyor apparatus must be stopped whenever exchange is required, and further with such a cease of operation, the sequential operation is also ceased for a while. Therefore, the exchange operation of the pulley requires a lot of trouble and time. The exchange of a large-sized pulley is attended with danger. Since replacement of the surface-lining rubber material is carried out at a special factory, it takes a long time before the arrival of a new pulley, so that the lowering of the rate of operation is unavoidable. Further, the occurrence of a similar wear phenomenon is found in not only the snap pulley 18 but also the bend pulley 21, or the tension pulley 22 shown in FIG. 4. A countermeasure for wear resistance of these pulleys is urgently desired.

The present invention has been made for removing such disadvantages of the prior art. The present invention is to provide the so-called free size type lagging body, and the lining of snap pulleys and other pulleys of various sizes can simply be carried out on the spot.

Figure 5A:
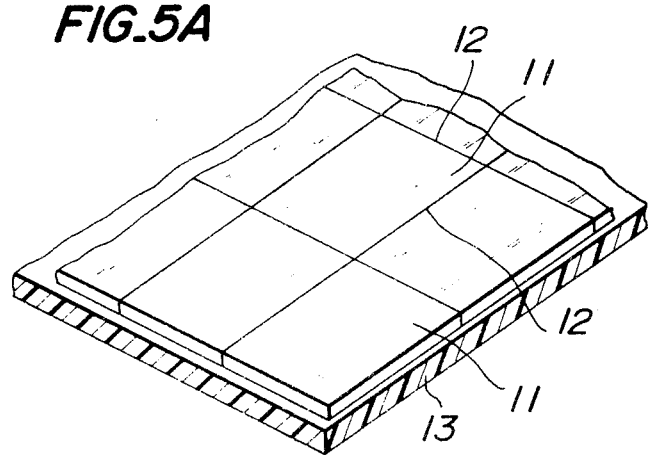
Figure 11:
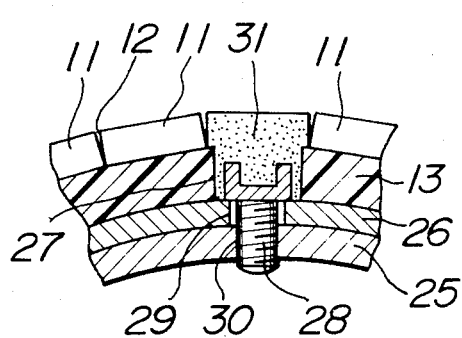

In FIG. 5(A), 11 is a rectangular small plate-like ceramic lagging element and having the smooth, compact and flat surface and water resisting property, a number of which elements are aligned on the surface of a wide and long rubber substrate 13 of a desired thickness in the lateral and longitudinal directions and secured thereto. 12 show close boundary lines in the lateral and longitudinal directions of each lagging element 11. The lagging elements 11 may be secured on the surface of the rubber substrate 13 by heat bonding or by use of a rubber bonding agent usable at a room temperature. In the former case, rectangular or square lagging elements 11 coated with a desired bonding agent on the rear surface are closely aligned in the lateral and longitudinal directions on the upper surface of a non-vulcanized rubber layer of a desired thickness for forming the rubber substrate 13 and heated with pressure in a mold. As a result, the bottom surface of the lagging element 11 is slightly depressed from the surface of the rubber substrate 13 and secured to the rubber substrate 13 by heat bonding. In addition, when employing heat bonding as the securing means, the heating is carried out under pressure, so that a very thin rubber layer is occasionally interposed between the closely contacted boundary surface 12 of the closely aligned lagging elements 11, but such rubber layer does not become a cause of any bad effect in practice.

Figure 5B:
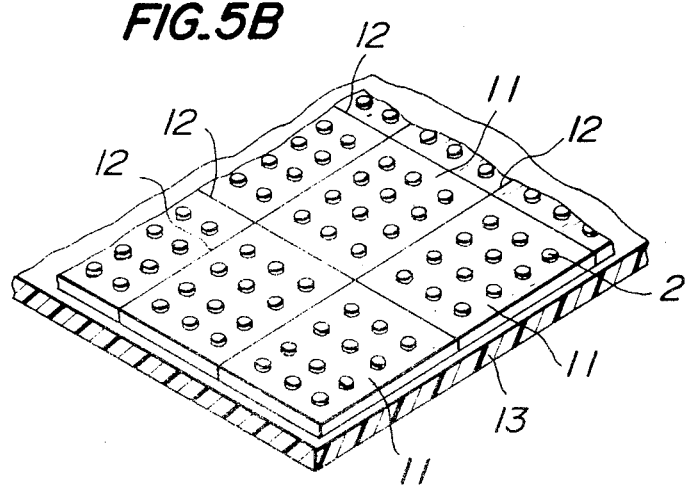
Figure 5C:
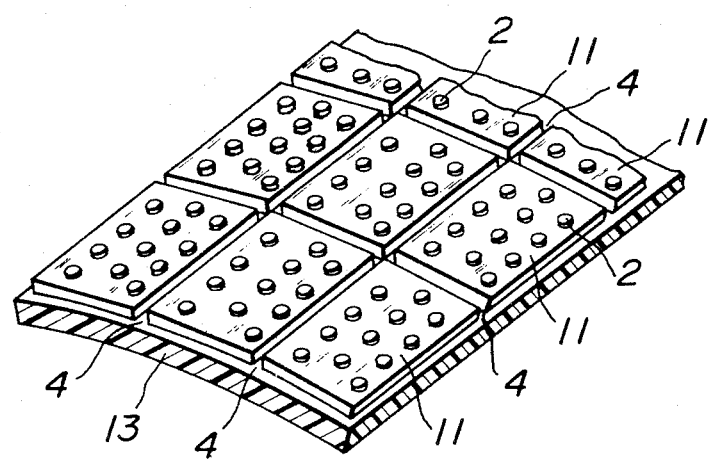

FIGS. 5(B) and 5(C) illustrate other embodiments. In FIG. 5(B), a lagging element 11 has a smooth, compact and flat surface with a small projection 2 scatteringly formed on the surface thereof and closely aligned on a wide and long rubber substrate 13 side by side in the lateral and longitudinal directions so as to increase the friction coefficient.

In FIG. 5(C), a lagging element 11 has also a smooth, compact and flat surface with a small projection 2 scatteringly formed on the surface thereof and aligned on a wide and long rubber substrate 13 with spacing grooves 4 having a desired width in the lateral and longitudinal directions. These type free-size lagging elements in FIGS. 5(B) and 5(C) are available to driving pulley.

In addition, the above-mentioned lagging element 11 is parallel and flat on both surfaces as shown in FIG. 6(A) and is a rectangular or square small plate-like element, but the rear surface may be formed into a flat shape while the front surface is made arcuate as shown in FIG. 6(B). When the arcuate lagging element 11' is rectangular, the surface at the cross section parallel to the short side is preferably made arcuate. In this manner, in case of adhering the lagging body to the surface of the pulley, the outer peripheral surface formed by each lagging element 11' can be made cylindrical.

FIGS. 6(C) and 6(D) illustrate lagging elements 11, 11' having small projections scatteringly formed on the upper surface of said element, which are available to use for lagging body as shown in FIGS. 5(B) and 5(C).

In addition, a favorable small plate-like ceramic lagging element 11 or 11' according to the present invention can be obtained by adding about 20–10% by weight of an inorganic bonding agent essentially consisting of glassy material such as silicon dioxide, sodium silicate, glaze or the like to about 80–90% by weight of fine powder of ceramics having a grain size of about 5–30 $\mu$ such as alumina, zircon, silicon carbide, silicon nitride, zirconia, mullite, cordierite, forsterite, steatite or the like and press-molded with a pressure of at least 0.5 ton/cm$^2$ thereto, and fired at a high temperature of more than 1,600° C.

That is, the lagging element 11 obtained as described above 6(A) and 6(B) have fine quality, smooth, compact surface and high wear resistance, and the smooth, compact surface lessens any trouble caused by adhesion of conveyed material, and further the water resisting property and durability can be increased from the nature of an inorganic bonding agent, and a long life of use can be expected. By the experimental data, the lagging element according to the present invention can continuously be used for 2–3 years.

One example of the actual dimension in the present invention is shown as follows. The rubber substrate is usually 2 m × 2 m and 5–10 mm in thickness. In case of the square lagging element 11, it is 25 mm × 25 mm and about 5–10 mm in thickness. In case of the rectangular lagging element 11 is about 30 mm × about 45 mm and about 6 mm in thickness. In addition, in case of adhering the lagging element to a pulley, as described in the foregoing, it is preferable to place the side of 45 mm of the lagging element parallel to the pulley in the axial direction (widthwise direction).

Further, as a bonding agent for adhering the lagging element according to the invention to the surface of the pulley, use may be made of a rubber bonding agent, a double fluid state epoxy resin bonding agent or the like.

As described above, according to the present invention, the rubber substrate is cut along the boundary line between lagging elements by matching with the outer periphery and the width of a pulley to be lined, and the thus cut lagging body is adhered to the outer periphery of the pulley by simple operation. As a result, a drive pulley, snap pulley, bend pulley or the like can be easily lined with ceramic lagging elements at the outer periphery at its working site, which is very efficient and economical. In addition, if the lagging body according to the present invention is adhered to the surface of each kind of pulley, the buffer action of the thick rubber substrate prevents any occurrence such as cracking or removal of said ceramic lagging element.

Further, the presence of the thick rubber substrate protects the lagging element from breakage, bending or the like in the case of conveying, storing, etc.

In the lagging element according to the present invention, the ceramic lagging element is very compact in quality, and has high wear resistance and very smooth surface, so that material adhered to and remaining on a conveyor belt does not adhere to a snap pulley or a bend pulley on the return run of the belt. Moreover, each lagging element is closely contacted with each other and secured to the rubber substrate without any spacing groove between adjacent lagging elements, so that the so-called "stay" phenomenon of residual material clogged in a spacing groove and gradually enlarged and growing into a lump rarely occurs. Further, the lagging element according to the present invention has an excellent water-resisting property and durability, since the inorganic bonding agent is specially selected for molding ceramic particles.

FIGS. 8 to 12 illustrate further embodiment of the present invention.

One embodiment will be explained with reference to FIG. 8. 25 is a metal pulley drum, and 26 a trough-like metal substrate having a suitable width by equally dividing the outer periphery of the metal pulley, and having equal curvature of the cross section to the metal pulley and a lateral width equal to the length of the metal pulley drum 25.

On the upper surface of outer periphery of the metal substrate 26 is secured a lagging body in which a number of small plate-like ceramic lagging elements 11 are closely aligned in the lateral and longitudinal directions on a rubber substrate 13 having a desired thickness and the width of metal substrate 26 except the portion provided with a bolt or screw hole 27 on both sides. In FIG. 8, 12 are boundary lines between adjacent lagging elements closely aligned in the lateral and longitudinal directions on the rubber substrate 13. Each ceramic lagging element 11 has a compact and smooth surface and wear resistance. The configuration of said lagging element is rectangular as shown in FIG. 10(A), square as shown in FIG. 10(B), having arcuate upper surface forming part of a cylindrical surface as shown in FIG. 10(C).

Each kind of pulleys such as snap pulleys, bend pulleys, etc. having the desired lagging elements over the outer periphery of pulley drum can easily be obtained by detachably mounted the metal substrate 26 on the metal pulley drum 25 by means of securing means such as bolt and nut or screw in which the rubber substrate 13 is secured on said metal substrate 26 by adhesive and a number of lagging elements are closely aligned side by side in the lateral and longitudinal directions and secured on said rubber substrate 13.

Figure 8:
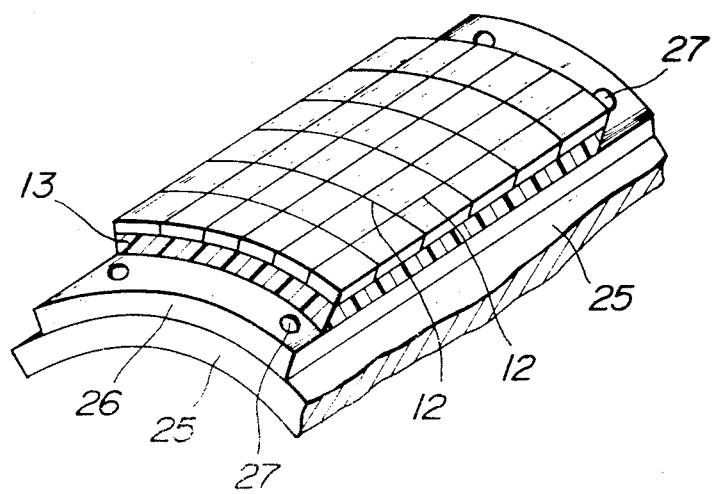
Figure 12:
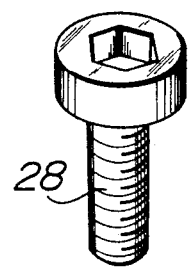

An embodiment shown in FIG. 9 is similar to that shown in FIG. 8 in relation of axial length and lateral width between the metal pulley drum 25 and the trough-like metal substrate 26, but the metal substrate 26 is secured over the entire surface of said metal pulley drum 25 by adhesive instead of securing means such as bolt and nut, so that this mounting condition of the trough-like metal substrate 26 to the metal pulley drum 25 differs from the case of FIG. 8 in construction. That is, in case of FIG. 8, the metal substrate 26 is detachably secured to the metal pulley drum 25 by securing means such as bolt and nut, so that there is shown a case of using a bolt 28 with a hexagonal hole as shown in FIG. 12, and in this embodiment of FIG. 9, the lagging elements II are closely aligned on the rubber substrate 13, but the lagging element to be placed at the position 31 corresponding to the screw position of the bolt 28 is previously removed from the rubber substrate 13 and the rubber substrate 13 with the lagging element 11 are secured to the metal substrate 26, and then as shown in FIG. 11, hole portions 27, 29 and a screw hole 30 for inserting bolts 28 with hexagonal holes are bored in the rubber substrate 13, the metal substrate 26 and the metal pulley drum 25 wherein the surface-lined lagging element 11 is removed, the metal substrate 26 is mounted on the metal pulley drum 25 by means of the bolt 28, and thereafter, an adhesive rubber putty as a filling material is filled in a depressed portion removed the surface-lined lagging element 11 therefrom, and after solidification of the filling material 31, the surface is ground to form a desired smooth shape. In addition, in this case, it is also available to set and secure the surface-lined lagging element 11 on the upper surface instead of filling said putty in the depressed portion. In addition, in order to secure the lagging element 11 to the surface of the trough-like metal substrate 26, a non-vulcanized rubber layer is interposed between the lagging element 11 and the metal substrate 26, heated with a pressure, and secured by vulcanization. Alternatively, the two surfaces of the rubber substrate 13 are adhered to the metal substrate 26 and the lagging element 11 respectively by an adhesive. Further, the shape of the lagging element 11 is not different from the case of the previous embodiments, and in both the embodiments, in case of the rectangular shape, the lagging element is secured to the metal substrate 26 for making the direction of the long side parallel to the axial direction of the metal pulley drum 25.

Figure 13:
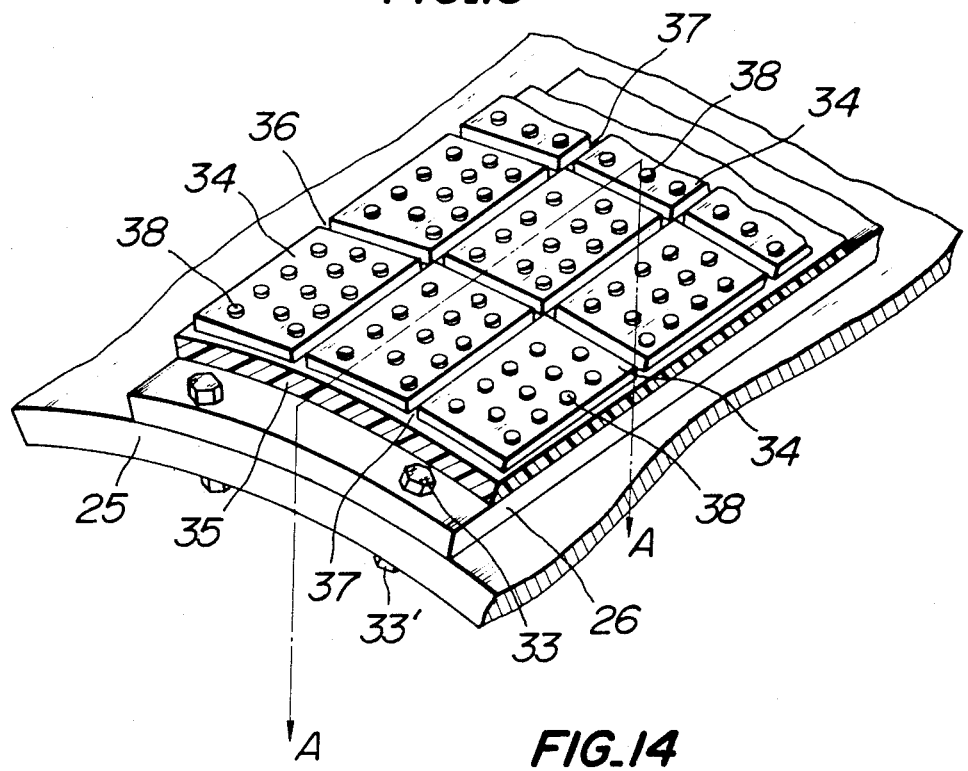
Figure 14:
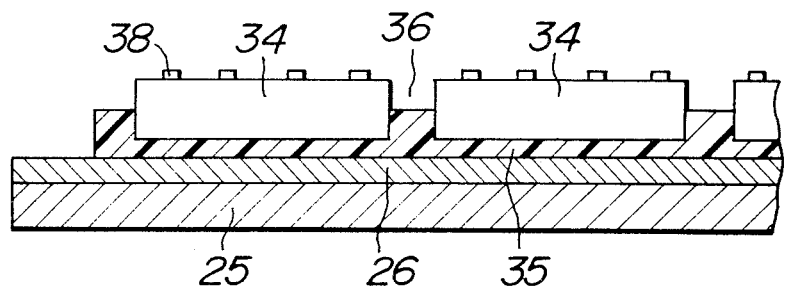

FIGS. 13 and 14 illustrate further embodiments of the present invention.

In FIG. 13, 25 is a metal pulley drum, and 26 is a metal substrate having a circular cross section, which circumferential width and axial length are determined to cover the whole outer periphery of said drum 25. These metal substrates 26 are secured by aligning both ends in the axial direction on the peripheral surface of the pulley drum 25 by means of bolt and nuts 33, 33'.

On the other peripheral surface of each metal substrate 26 are aligned a number of rectangular flat plate-like wear resistant ceramic plates 34 having a desired size and small projections 38 scatteringly formed through a rubber adhesive layer 35 in the circumferential direction and the axial direction (widthwise direction) and secured thereto.

In addition, as shown in FIG. 14, in case of aligning ceramic lagging elements 34 on the metal substrate 26, desired gap may be provided in the circumferential direction and the axial direction between the ceramic plates 34, in case of which the back surfaces of the ceramic plates 34 are slightly depressed toward the inside from the upper surface of the rubber adhesive layer 35, and there are formed grooves 36, 37 crosswise between adjacent ceramic plates 34, 34. FIGS. 13 and 14 illustrate a number of small projections 38 formed on the surface of the ceramic lagging plate 34 for preventing from slipping. Alternatively, as the case as shown in FIG. 13, a rectangular or square small plate-like ceramic lagging element may be aligned side by side on the surface of rubber adhesive layer 35 with grooves 36, 37 and secured thereon.

In order to secure the ceramic lagging plates 34 on the surface of the metal substrate 26 through the rubber adhesive layer 35, an adhesive is applied to the surface of the metal substrate 26 and non-vulcanized rubber is placed thereon in a predetermined thickness and a rubber adhesive similar to that applied to the metal substrate 26 is applied on the upper surface of the rubber adhesive layer, and then the ceramic lagging elements 34 are aligned to a predetermined width in the lateral and longitudinal directions with grooves, heated, bonded and secured.

Thus, a number of ceramic plates 34 are aligned on the surface of rubber adhesive layer 35 as shown in FIG. 14, and the resulted metal substrate 26 secured by heat bonding lagging element through rubber adhesive layer 35 are aligned on the cylindrical peripheral surface of the pulley drum 25 and secured as shown in FIG. 13, thereby a desired drive pulley can be obtained.

One embodiment will be shown with reference to the acutal size. With respect to the metal pulley drum 25 of 800 mm in outer diameter and 1,500 mm in width (length in the axial direction), the metal substrate 26 is about 200 mm in width in the circumferential direction (designed to cover the outer periphery of the pulley drum 25 with twelve pieces of metal substrate 26) and 4.5 mm in thickness. The wear-resistant ceramic lagging plate 34 is a rectangular plate of 30 mm × 40 mm (placed the side of 40 mm in parallel to the axial direction (widthwise direction) of the metal substrate 26) and 10 mm in thickness. The thickness of the rubber adhesive layer 35 on the metal substrate 26 is 5.5 mm, and the width and the depth of the depressed grooves formed between each ceramic lagging plate 34 in the lateral and longitudinal directions are 5 mm, respectively. As a result of the experiment, a good result was obtained.

The functions and effects of ceramic lagging body according to the present invention as constructed as described above are as follows.

(1) A drive pulley is constructed by aligning and securing wear-resistant ceramic elements having a desired size and shape with rubber substrate onto the cylindrical peripheral surface of a metallic pulley drum, so that it becomes possible to obtain the drive pulley having a desired drum diameter and a width thereof by only adhering a number of wear-resistant ceramic lagging elements having the same shape and size on the rubber substrate within the range of necessary kinds of pulley, and as a result, the wear-resistant ceramic element can be widely used.

(2) A drive pulley having a desired size can be constructed by such simple and easy working means that the wear-resistant ceramic elements are aligned and secured on the outer peripheral surface of a cylindrical metallic drum through a rubber adhesive layer of a desired thickness, and a comparatively small wear-resistant ceramic element is adaptable to the outer periphery of said cylindrical metal drum firmly, so that the ceramic lagging element is never broken or slipped off and it is functionally excellent as compared with the prior type lagging element.

(3) Further, as explained in the embodiment, the grooves formed between the ceramic lagging elements secured to the peripheral surface of the cylindrical metal drum through the rubber adhesive layer are formed as depressed grooves, so that conveying articles, dredges, water or the like adhered to the surface of the drive pulley are dispersed and exhausted to the outside through these grooves, the surface of the drive pulley is constantly remained clean, friction resistance is never decreased, and a long life can be expected.

(4) In addition, with the use of the wear-resistant ceramic lagging plates according to the present invention, the friction resistance between conveyor belt and pulley drum increases more than 70% as compared with the conventional type pulley provided with an adhesive rubber layer around the outer periphery of the metal pulley drum, and as a result, it is very effective to simplify the apparatus, such as miniaturization of a drive pulley and the cost of equipment can be reduced by a large margin.

In addition, a number of parallel corrugated grooves may be formed on the upper surface of the ceramic lagging element 34 instead of the said small projections.

The present invention is not limited to the embodiments shown in the attached drawings, but it can be modified without departing from the idea or spirit of the present invention.

What is claimed is:

1. A lagging body available for a belt conveyor pulley, comprising, a rubber substrate, a number of small plate-like ceramic lagging elements aligned in the lateral and longitudinal directions and secured on the surface of said rubber substrate, wherein said lagging element consists of 80-90% by weight of ceramic particles added with 20-10% by weight of an inorganic bonding agent selected from silica, sodium silicate and glaze of glassy material.

2. A lagging body as defined in claim 1, wherein said lagging elements are molded into a small plate with a pressure and fired at a high temperature so as to make the surface smooth and compact, aligned on the surface of a rubber substrate by being closely aligned side by side between adjacent elements to each other and secured on the surface of said rubber substrate.

3. A lagging body as defined in claim 1, wherein said lagging elements consisting of ceramics are produced by molding with a pressure into a small plate article and fired at a high temperature so as to make the surface smooth and compact and being aligned on the surface of a rubber substrate with spacing grooves having a given width between adjacent lagging elements in the lateral and longitudinal directions and secured on the surface of said rubber substrate.

4. A lagging body as defined in claim 1, wherein said lagging element has a compact and smooth surface with a number of small projections, closely aligned side by side between adjacent members in the lateral and longitudinal directions, and secured on a rubber substrate.

5. A lagging body as defined in claim 1, wherein said lagging elements are manufactured by press molding into a small plate-like article with a number of scattered small projections and fired at a high temperature, whereby said lagging element has a compact and smooth surface with a number of small projections scatteringly formed thereon, aligned with spacing grooves in the lateral and longitudinal directions and secured on a rubber substrate.

6. A lagging body as defined in claim 1, wherein said ceramic lagging element having a sintered coarse surface is provided with scattered small projections so as to make the surface of the lagging element uneven.

7. A lagging body as defined in claim 1, wherein said heat bonding is carried out by vulcanizing rubber.

8. A lagging body as defined in claim 1, wherein said lagging element is made by adding an inorganic bonding agent to ceramic particles of 10-54 mesh and sintering at a low temperature to make the surface coarse, a number of the resulting lagging elements are aligned on a rubber substrate by spacing with grooves having a given width in the lateral and longitudinal directions and secured on said rubber substrate.

9. A lagging body as defined in claim 8, wherein the lagging elements having the coarse surface are closely aligned side by side to each other in the lateral and longitudinal directions and secured on the surface of a rubber substrate.

10. A lagging body as defined in claim 1, wherein said lagging element comprises a water-resisting small plate-like compact ceramic body having a smooth and compact surface and consisting of 80-90% by weight of ceramic fine powder added with 20-10% by weight of inorganic glassy bonding agent molded into a small plate with a pressure of at least more than 0.5 ton/cm$^2$ and fired at a high temperature of more than 1,600° C.

11. A lagging body as defined in claim 1, wherein said lagging element consists of 80-90% by weight of ceramic fine powder of 5-30$\mu$ added with 20-10% by weight of an inorganic bonding agent essentially consisting of glassy material selected from silica, sodium silicate and glaze is molded with a pressure into a plate and fired at a high temperature of more than 1,600° C. so as to form a water-resisting small plate-like body having a compact and smooth surface.

12. A lagging body as defined in claim 1, wherein said lagging element consists of a small plate-like ceramic body having a coarse surface and consisting of 80-90% by weight of ceramic particles of 10-54 mesh, and 20-10% by weight of an inorganic glassy bonding agent mainly selected from silicon dioxide, sodium silicate and glaze and sintered at a low temperature of 800° C. to 1,000° C.

13. A lagging body as defined in claim 1, wherein said ceramic particle consists of at least one element selected from alumina, zirconia, mullite, zircon, silicon carbide and silicon nitride.

14. A lagging body as defined in claim 1, wherein a small plate-like lagging element having a smooth and compact surface and consisting of compact ceramics is formed by adding 20-10% by weight of an inorganic bonding agent mainly consisting of glassy material selected from silicon dioxide, sodium silicate and glaze to 80-90% by weight of ceramic fine powder of 5-30$\mu$, molding with a pressure of more than 0.5 ton/cm$^2$ into a small plate-like body, and firing at a high temperature of more than 1,600° C.

15. A lagging body as defined in claim 1, wherein the small plate-like lagging element consisting of ceramics and having a coarse surface is manufactured by adding 20-10% by weight of an inorganic bonding agent to 80-90% by weight by ceramic particles of 10-54 mesh and kneading, molding into a small plate-like body, and sintering at a low temperature of 800° to 1,000° C.

16. A lagging body as defined in claim 1, wherein a number of small projections are formed on the surface of a small plate-like ceramic lagging element by molding with a pressure and fired at a high temperature of more than 1,600° C. so as to provide a ceramic lagging element having a smooth and compact surface with a number of small projections on said surface.

17. A lagging body as defined in claim 1, wherein a small plate-like lagging element is molded with a pressure of less than 0.5 ton/cm$^2$ so as to form a number of small projections in a fashion scattered it on the surface, sintered at a low temperature of 800° to 1,000° C. so as to provide a small plate-like lagging element having a coarse surface with small projections.

18. A lagging body available for a belt conveyor pulley, comprising a metal substrate having a trough-like cross section and divided into several sections so as to detachably secure around the outer periphery of a metal pulley drum, a rubber substrate secured on said metal substrate, a number of small plate-like ceramic lagging elements aligned in the lateral and longitudinal directions and secured on said rubber substrate.

19. A lagging body as defined in claim 18, wherein a lagging body comprises a metal substrate having a trough-like cross section and divided into several sections so as to detachably secure around the outer periphery of a metal pulley drum, a rubber substrate secured on said metal substrate, said ceramic lagging elements having a compact and smooth surface with small projections scatteringly formed thereon and closely aligned in contact with side by side in the lateral and longitudinal directions and secured on said rubber substrate.

20. A lagging body as defined in claim 18, wherein a metal substrate having a trough-like cross section and divided into several sections so as to detachably secure around the outer periphery of a metal pulley drum, a rubber substrate secured on said metal substrate, said ceramic lagging elements having a compact and smooth surface with small projections scatteringly formed thereon and aligned with spacing grooves having a desired width in the lateral and longitudinal directions and secured on said rubber substrate.

21. A lagging body as defined in claim 18, wherein a lagging body comprises a trough-like metal substrate divided into several sections so as to be detachably secured around the outer periphery of a metal pulley, a rubber substrate secured on said metal substrate and said lagging elements integrally secured on said rubber substrate by heat bonding with a non-vulcanized rubber substrate.

22. A lagging body as defined in claim 18, wherein the securing is made by a bonding agent.

23. A lagging body as defined in claim 18, wherein the lagging element is integrally secured by vulcanization with rubber substrate and said rubber substrate is secured with the metal substrate by a bonding agent.

24. A lagging body as defined in claim 18, wherein said lagging elements having a smooth and compact surface are closely aligned side by side in the lateral and longitudinal directions between adjacent elements to each other on the surface of a rubber substrate and secured on the surface of said rubber substrate.

25. A lagging body as defined in claim 18, wherein said ceramic lagging elements having a smooth and compact surface aligned on the surface of the rubber substrate with spacing grooves having a given width between adjacent lagging elements in the lateral and longitudinal directions and secured on the surface of said rubber substrate.

26. A lagging body as defined in claim 19, wherein said lagging elements having a sintered coarse surfaces are aligned with grooves having a given width in the lateral and longitudinal directions on said rubber substrate and secured on the surface of said rubber substrate.

27. A lagging body as defined in claim 18, wherein said ceramic lagging elements having a sintered coarse and uneven surface with scattered small projections are aligned with grooves between adjacent elements in the lateral and longitudinal directions on a rubber substrate and secured on said rubber substrate.

28. A lagging body as defined in claim 18, wherein the lagging elements having the coarse surface are closely aligned side by side to each other in the lateral and longitudinal directions and secured on the surface of a rubber substrate.

29. A pulley comprising a pulley drum, a lagging body secured around the outer periphery of the pulley drum by a bonding agent, said lagging body comprising a number of small plate-like ceramic lagging elements on the surface of a rubber substrate closely aligned side by side to each other in the lateral and longitudinal directions and secured on said substrate.

30. A pulley as defined in claim 29, wherein the lagging element is molded with a pressure and has a smooth and compact ceramic surface.

31. A pulley as defined in claim 29, wherein the lagging element consists of ceramics having a smooth and compact surface with a number of small projections scatteringly formed on said surface so as to make it uneven.

32. A pulley as defined in claim 29, wherein a metal pulley drum comprises a metal substrate having a trough-like cross section and divided into several sections so as to detachably secure around the outer periphery of a metal pulley drum, a rubber substrate secured on said metal substrate, said ceramic lagging elements having a compact and smooth surface with small projections scatteringly formed thereon and aligned with spacing grooves having a desired width in the lateral and longitudinal directions and secured on said rubber substrate.

33. A pulley as defined in claim 29, wherein a metal pulley drum comprises a metal substrate having a trough-like cross section and divided into several sections so as to detachably secured around the outer periphery of said metal pulley drum, a rubber substrate having a given thickness secured on said metal substrate, said lagging elements which are molded into a small plate with a pressure and fired at a high temperature so as to make the surface smooth and compact, closely aligned side by side between adjacent elements to each other on the surface of said rubber substrate and secured by heat bonding or adhering by means of a bonding agent on the surface of said rubber substrate.

* * * * *